United States Patent
Yoshida et al.

(10) Patent No.: US 7,373,434 B2
(45) Date of Patent: May 13, 2008

(54) MULTI-FUNCTION APPARATUS AND CONTROL METHOD THEREOF

(75) Inventors: Takehiro Yoshida, Tokyo (JP); Shunichi Fujise, Abiko (JP); Junji Iguchi, Yokohama (JP); Daisuke Suga, Kawasaki (JP); Hideya Tabeta, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 484 days.

(21) Appl. No.: 11/082,689

(22) Filed: Mar. 18, 2005

(65) Prior Publication Data

US 2005/0216649 A1 Sep. 29, 2005

Related U.S. Application Data

(63) Continuation of application No. PCT/JP2005/002655, filed on Feb. 10, 2005.

(30) Foreign Application Priority Data

Mar. 23, 2004 (JP) ............................. 2004-084061

(51) Int. Cl.
*G06F 3/00* (2006.01)
*G06F 13/12* (2006.01)
*G06F 1/00* (2006.01)

(52) U.S. Cl. .............................. 710/14; 710/8; 710/15; 710/62; 713/300; 713/324

(58) Field of Classification Search .................... None
See application file for complete search history.

(56) References Cited

U.S. PATENT DOCUMENTS 7,130,940 B2 * 10/2006 Ikeda ........................... 710/72

7,203,854 B2 * 4/2007 Luke et al. ................. 713/320

FOREIGN PATENT DOCUMENTS

| JP | 6-86003 | 3/1994 |
|----|---------|--------|
| JP | 9-98213 | 4/1997 |
| JP | 10-63816 | 3/1998 |
| JP | 2000-134355 | 5/2000 |
| JP | 2003-110762 | 4/2003 |
| JP | 2003-118204 | 4/2003 |

OTHER PUBLICATIONS

International Preliminary Report on Patentability in PCT/JP2005/002655.

* cited by examiner

*Primary Examiner*—Alan S. Chen
(74) *Attorney, Agent, or Firm*—Fitzpatrick, Cella, Harper & Scinto

(57) ABSTRACT

A multi-function apparatus having a wider variety of uses and easily employed when carrying a USB cable only without having a power source cord. The apparatus includes means for detecting a connection between the USB interface and the PC, means for detecting a connection to the power line, and control means for selecting a function depending on a detected state of the connection between the USB interface and PC and a detected state of the connection to the AC power line. All the functions in the multi-function apparatus are operable in a connected state of the AC power line to the AC power source, while even in an unconnected state of the AC power line to the AC power source, if the USB interface is connected to the PC, a possible operation is enabled using electric power of 5 V at 500 mA supplied from the PC.

8 Claims, 9 Drawing Sheets

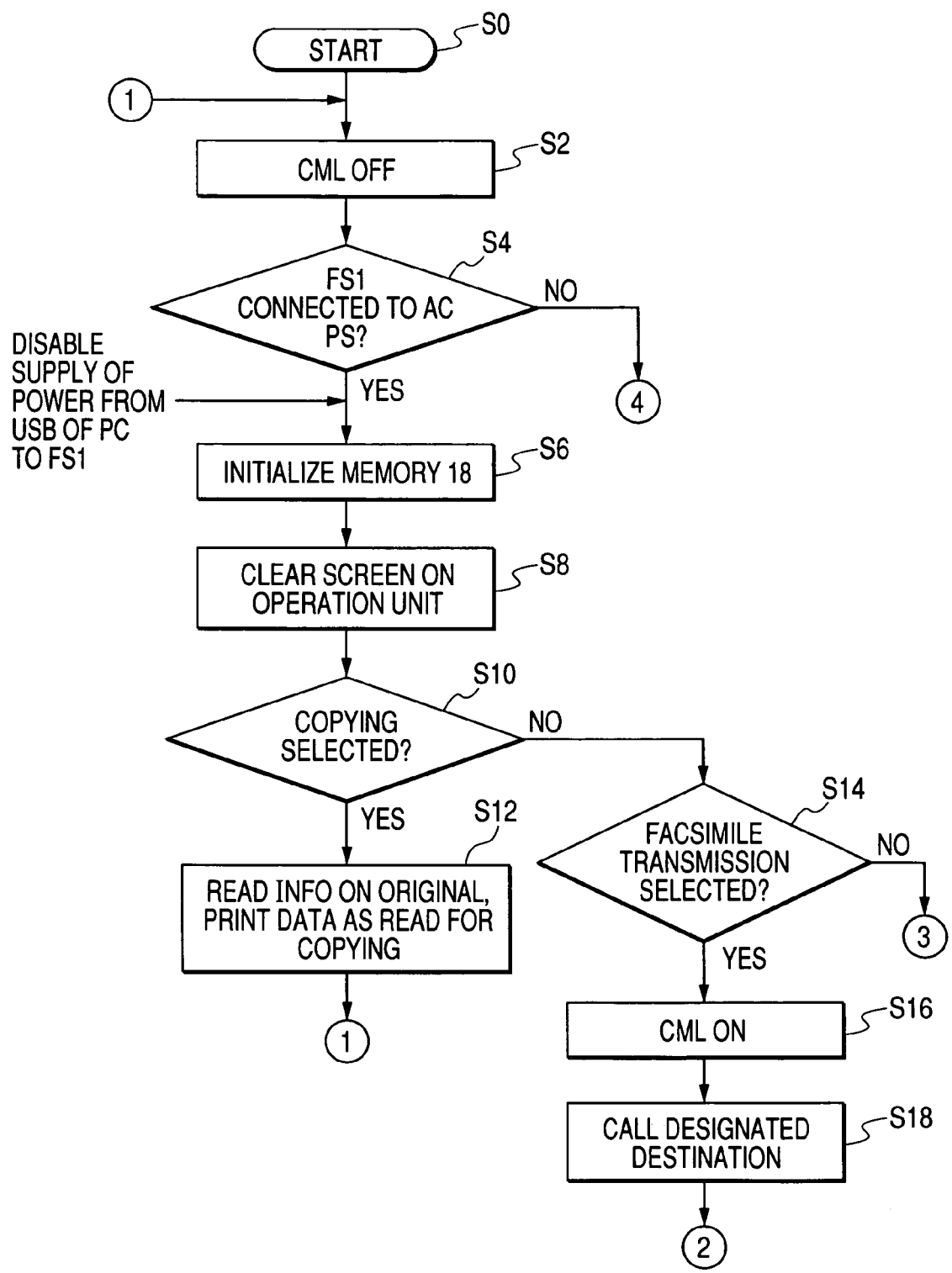

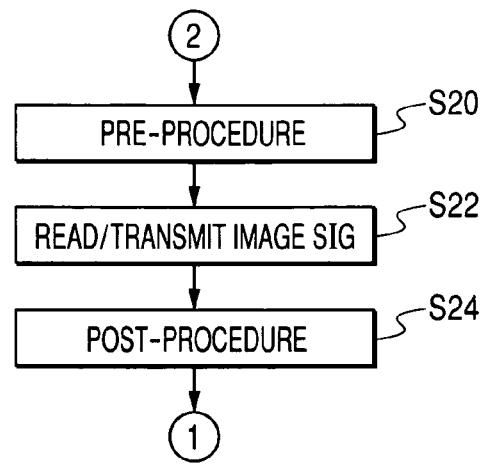
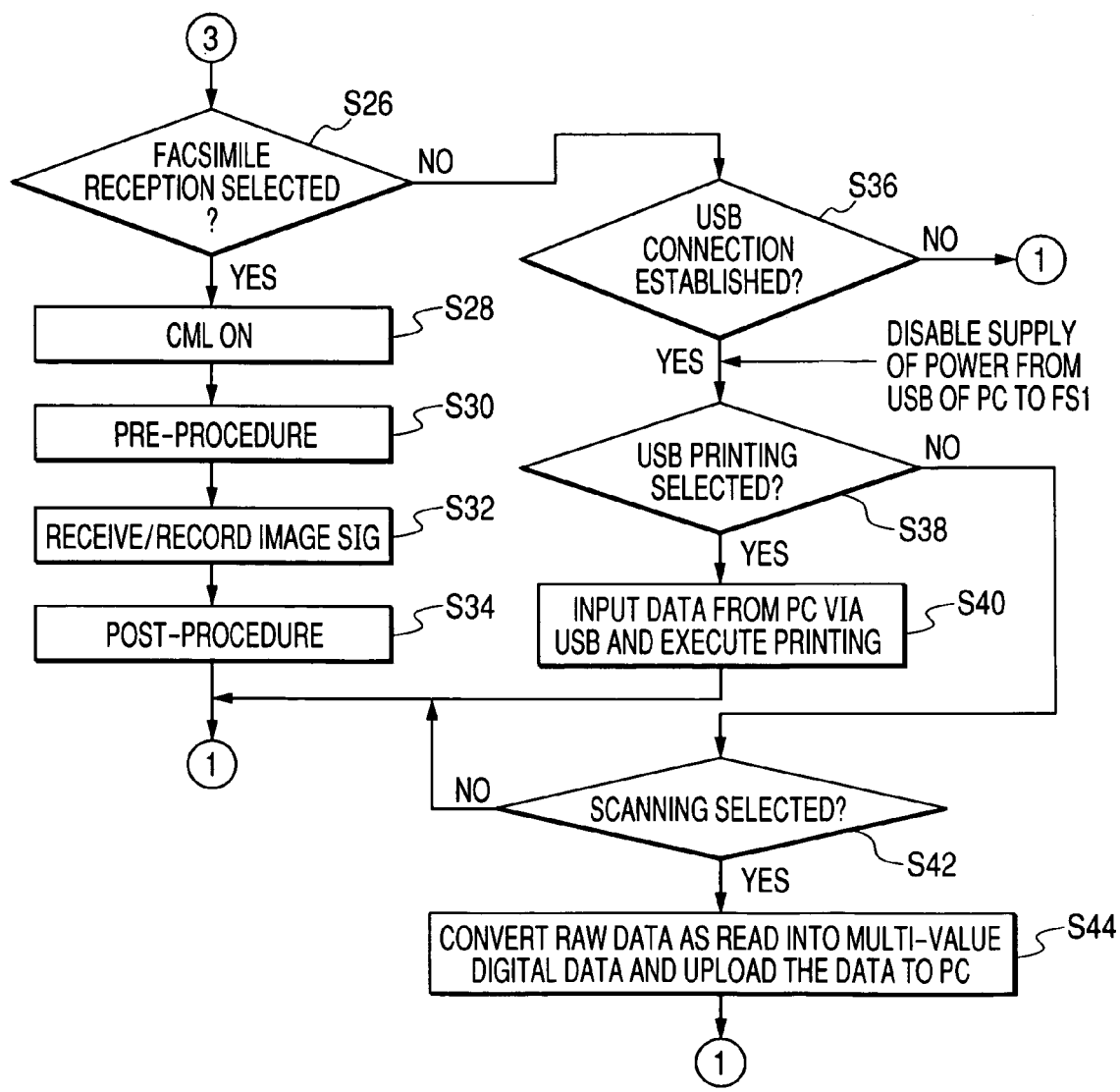

MULTI-FUNCTION APPARATUS AND CONTROL METHOD THEREOF

This application is a continuation of International Application No. PCT/JP2005/002655, filed Feb. 10, 2005, which claims the benefit of Japanese Patent Application No. 2004-084061 filed Mar. 23, 2004.

BACKGROUND OF THE INVENTION

1. Field of the Invention

The present invention relates to a multi-function apparatus, and more particularly, to a multi-function apparatus having a USB interface and a control method thereof.

2. Related Background Art

A conventional multi-function apparatus (MFP apparatus) having a USB interface operates with an AC power source connected to the AC power line.

That is, the multi-function apparatus has a copy function, a scanner function, a print function and a facsimile function as the major, all these functions being supplied with electric power from the AC power line, and not operable when no AC power is supplied.

An apparatus is well known in which in a power saving state, power is supplied from the telephone line, and if an image is received by facsimile, the received image is not printed but stored in memory (Japanese Patent Application Laid-Open No. 2003-118204).

SUMMARY OF THE INVENTION

However, an electric power of 5 V at a maximum of 500 mA can be supplied from the host side to the peripheral side in the USB interface standard. In the conventional example, even if the USB interface is connected and an electric power of 5 V at 500 mA is supplied from the PC, no operation is made.

In the future, when there are increasing multi-function terminals of handy type along with the miniaturization of the MFP apparatus, a user will carry the USB cable only without having the power source cord.

Herein, in the case where the USB interface is connected and the apparatus is operable with a voltage supplied via the USB interface from the PC, even if no AC power is supplied, such operation can be effective.

Thereby, the user can employ the scanner operation simply by connecting the apparatus via the USB interface to the PC, for example.

However, when the number of multi-function terminals of handy type increases, there is a problem that the MFP apparatus can not be employed without having the power source cord, and is difficult to employ.

It is an object of the present invention to provide a multi-function apparatus and its control method in which the MFP apparatus has a wider variety of uses and is easy to employ in the case of carrying the USB cable only without having the power source cord, even when there are increasing multi-function terminals of handy type.

BRIEF DESCRIPTION OF THE DRAWINGS

FIG. 2 is a flowchart showing an operation of the embodiment;

FIGS. 3A and 3B are flowcharts showing the operation of the embodiment;

DESCRIPTION OF THE PREFERRED EMBODIMENTS

The preferred embodiments of the present invention will be described below.

First Embodiment

Figure 1:
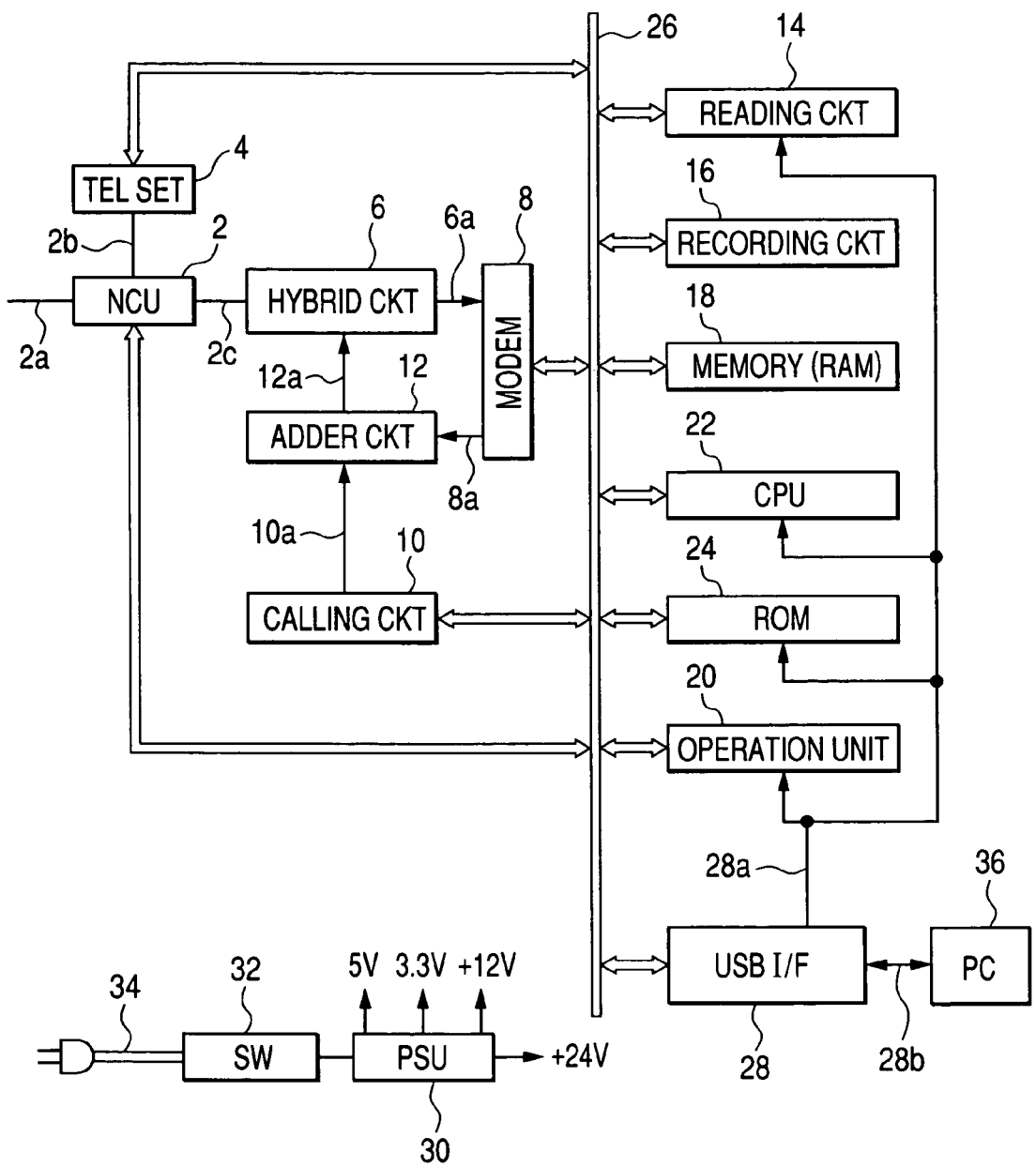
FIG. 1 is a block diagram of a facsimile apparatus FS1 according to a first embodiment of the present invention.
Figure 4:
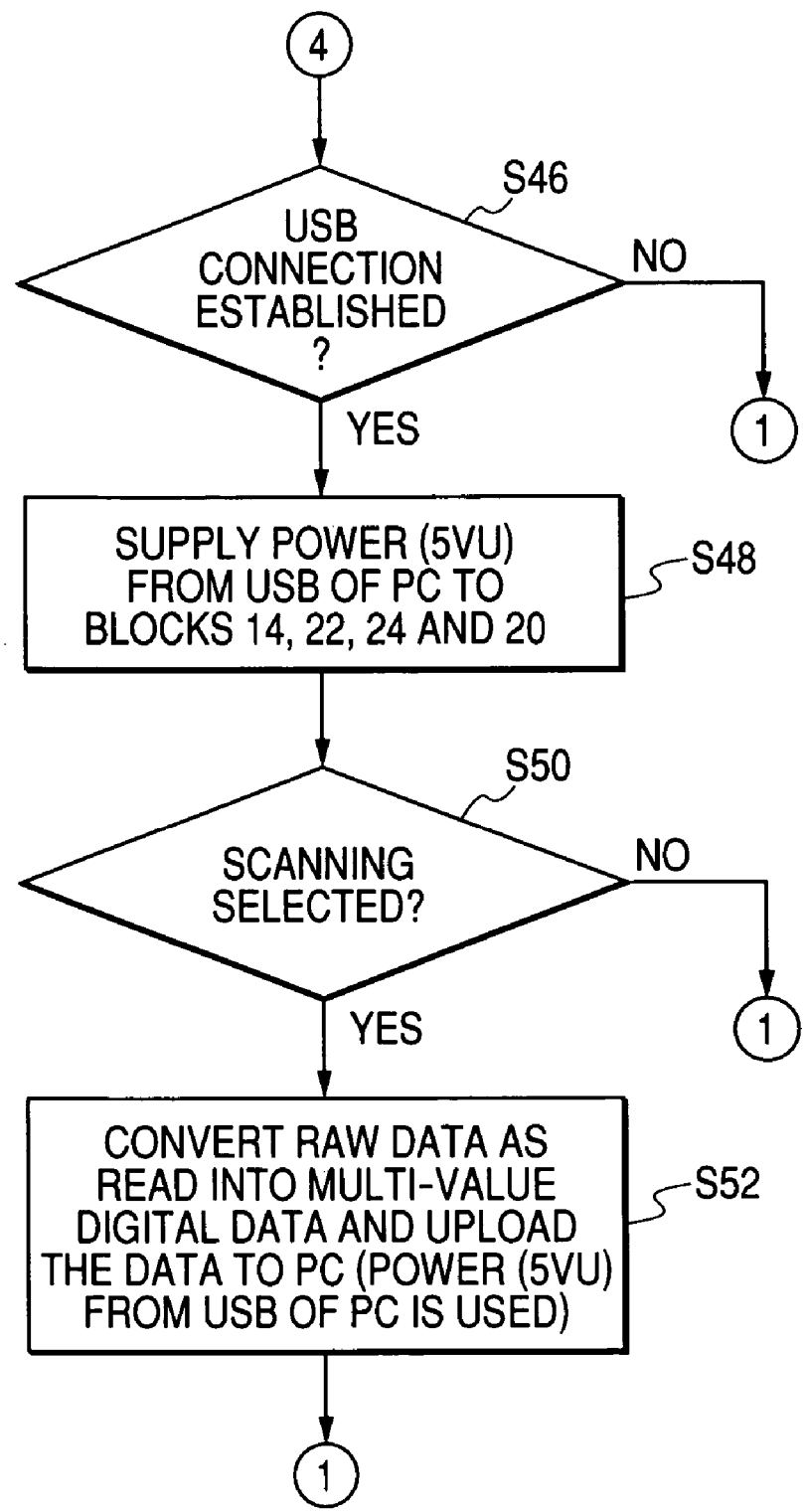
FIG. 4 is a flowchart showing the operation of the embodiment.

FIG. 1 is a block diagram of a facsimile apparatus FS1 according to a first embodiment of the present invention.

The facsimile apparatus FS1 comprises an NCU (Network Control Unit) 2, a hybrid circuit 6, a modem 8, a calling circuit 10, an adder circuit 12, a color readable reading circuit 14, a color recordable recording circuit 16, a memory circuit 18, an operation unit 20, a CPU (Central Processing Unit) 22, a ROM 24, a USB interface 28, a PSU (Power Source Unit) 30, and a switch 32.

To make use of a telephone network for data communication, the NCU (Network Control Unit) 2 is connected to a terminal on the line, controls connection with the telephone switching network, switches into a data communication channel, and holds a loop. Also, the NCU 2 connects a telephone line 2a to the side of the telephone set (CML off) or connects the telephone line 2a to the side of the facsimile apparatus FS1 (CML on) under the control from a bus 26. In a normal state, the telephone line 2a is connected to the side of the telephone set 4.

The hybrid circuit 6 separates a transmitting signal and a received signal, sends out the transmitting signal from the adder circuit 12 via the NCU 2 to the telephone line 2a, receives a signal from the partner terminal via the NCU 2, and sends it on a signal line 6a to the modem 8.

The modem 8 is a modulator/demodulator for making the modulation and demodulation on the basis of the ITU-T recommendation V.8, V.21, V.27ter, V.29, V.17 and V.34, in which each transmission mode is designated under the control of the bus 26. The modem 8 inputs a transmitting signal from the bus 26, outputs the modulated data to a signal line 8a, inputs a received signal outputted on the signal line 6a, and outputs the demodulated data to the bus 26.

The calling circuit 10 inputs the telephone number information based on a signal from the bus 26, and outputs a selection signal of DTMF to a signal line 10a.

The adder circuit 12 inputs the information of the signal line 8a and the information of the signal line 10a, and outputs the addition result to a signal line 12a.

The color readable reading circuit 14 outputs the read data to the bus 26.

The color recordable recording circuit 16 sequentially records the information outputted to the bus 26 line by line.

The memory circuit 18 is a work memory (RAM) for storing raw information of read data and coded information, and storing the received information and decoded information via the bus 26.

The operation unit 20 has one-touch dial, abbreviated dial, ten-key, * key, # key, start key, stop key, set key, scan key and other function keys, in which the pressed information is outputted to the bus 26. The operation unit 20 is provided with a display unit for displaying the information on the bus 26.

The CPU (Central Processing Unit) 22 controls the overall facsimile apparatus FS1, and performs a facsimile transmission control procedure, based on a control program stored in the ROM 24.

The USB interface 28 is connected via the USB on a signal line 28b to a PC 36 externally connected. The USB on the PC side is the host to supply a power of 5 V, up to 500 mA. When the USB interface is connected in a state where no AC power is supplied to the apparatus FS1, the USB interface 28, supplied with this power, supplies a voltage of 5 V via the signal line 28a to the reading circuit 14, the CPU 22, the ROM 24 and the operation unit 20.

The PSU (power source) 30 supplies 3.3 V, 5 V, 12 V or 24 V to each block. Herein, the switch 32 turns on or off the AC power supply. Reference numeral 34 designates an AC power cord.

The ROM 24 stores a control program executed by the CPU, as described below.

The multi-function apparatus available for multiple purposes comprises the USB interface, means for detecting connection between the USB interface and the PC, and means for detecting connection to the power line, in which the operable functions are changed depending on the connection detected state between the USB interface and the PC and the connection detected state to the AC power line.

Herein, if the USB interface and the PC are connected, and the facsimile apparatus FS1 is connected to the AC power line, all the functions of the facsimile apparatus FS1 are operable. Also, if the USB interface and the PC are connected, and the facsimile apparatus FS1 is not connected to the AC power line, a specific function is operable, and other functions than the specific function are inoperable.

Specifically, the operable functions include the copy function, scanner function, print function and facsimile function, and the specific function is the scanner function.

The above control program is stored in the ROM 24.

The operation of this embodiment will be described below.

FIGS. 2, 3A, 3B and 4 are flowcharts showing the operation of this embodiment.

At step S2, the CML of the NCU 2 is turned off via the bus 26. At step S4, it is determined whether or not the facsimile apparatus FS1 is connected to the AC power source. If the facsimile apparatus FS1 is connected to the AC power source, the procedure goes to step S6, or otherwise, to step S46.

When the facsimile apparatus FS1 is connected to the AC power source at step S4, it is important that no electric power from the USB of the PC is supplied to the facsimile apparatus FS1.

At step S6, the memory 18 is initialized via the bus 26. At step S8, the display unit of the operation unit is cleared via the bus 26.

At step S10, it is determined whether or not the copy operation is selected by inputting the information of the operation unit. If the copy operation is selected, the procedure goes to step S12, where the set original sheet information is read, printed, and copied, or otherwise, the procedure goes to step S14.

At step S14, it is determined whether or not the facsimile transmission is selected by inputting the information of the operation unit. If the facsimile transmission is selected, the procedure goes to step S16, or otherwise, to step S26. At step S16, the CML of the NCU 2 is turned on via the bus 26. At step S18, the calling circuit calls a designated destination via the bus 26. At step S20, a pre-procedure is performed. At step S22, an image signal is read and transmitted. At step S24, a post-procedure is performed.

At step S26, it is determined whether or not the facsimile reception is selected. If the facsimile reception is selected, the procedure goes to step S28, or otherwise, to step S36. At step S28, the CML of the NCU 2 is turned on via the bus 26. At step S30, a pre-procedure is performed. At step S32, an image signal is received and recorded. At step S34, a post-procedure is performed.

At step S36, it is determined whether or not the USB connection is established. If the USB connection is established, the procedure goes to step S38, or otherwise, to step S2.

When the USB connection is established at step S36, it is important that no electric power from the USB of the PC 36 is supplied to the facsimile apparatus FS1. At step S38, it is determined whether or not the USB printer is selected by inputting the information of the operation unit. If the USB printer is selected, the procedure goes to step S40, where data from the PC 36 is inputted via the USB and printed, or otherwise, to step S42.

At step S42, it is determined whether or not the scanning is selected by inputting the information from the USB interface. If the scanning is selected, the procedure goes to step S44, where the color read information of raw data is converted into multi-value digital data and uploaded to the PC 36, or otherwise, to step S2.

At step S46, it is determined whether or not the USB connection is established. If the USB connection is established, the procedure goes to step S48, or otherwise, to step S2. At step S48, a power (5 VU) from the USB of the PC 36 is supplied to the blocks 14, 22, 24 and 20 of the apparatus. At step S50, it is determined whether or not the scanning is selected by inputting the information from the USB interface. It is determined whether or not the scanning is selected, the procedure goes to step S52, where the color read information of raw data is converted into multi-value digital data and uploaded to the PC 36 (here employing a power (5 VU) from the USB of the PC 36), or otherwise, to step S2.

Second Embodiment

In a second embodiment of the present invention, the facsimile apparatus FS1 (multi-function apparatus) of the first embodiment has, as the operable function, at least one of the copy function, scanner function, print function and facsimile function.

According to the first invention, there is provided a multi-function apparatus available for multiple purposes, comprising means for detecting a connection between the USB interface and the PC 36, and means for detecting a connection to the power line, wherein the operable function can be changed depending on a detected state of the connection between the USB interface and the PC 36 and a detected state of the connection to the AC power line.

According to the second invention, in the multi-function apparatus of the first invention, if the USB interface and the PC 36 are connected, and the multi-function apparatus is connected to the AC power line, all the functions in the multi-function apparatus are operable.

According to the third invention, in the multi-function apparatus of the first or second invention, if the USB interface and the PC 36 are connected, and the multi-function apparatus is not connected to the AC power line, a specific function in the multi-function apparatus is operable.

According to the fourth invention, in the multi-function apparatus of the third invention, if the USB interface and the PC 36 are connected, and the multi-function apparatus is not connected to the AC power line, other functions than the specific function are not operable.

Thereby, all the functions are operable in a connected state of the AC power line to the AC power source, while even in an unconnected state of the AC power line to the AC power source, if the USB interface is connected to the PC 36, a possible operation can be made using electric power of 5 V at 500 mA supplied from the PC 36. Consequently, when the number of multi-function terminals of handy type increases along with the smaller size of the MFP apparatus, the apparatus has a wider variety of uses and is easy to employ in the case of carrying the USB cable only without having the power source cord, for example.

According to the fifth invention, in the multi-function apparatus of the first, second, third or fourth invention, the copy function, the scanner function and the print function are operable.

According to the sixth invention, in the multi-function apparatus of the first, second, third or fourth invention, the copy function, the scanner function, the print function and the facsimile function are operable.

According to the seventh invention, in the multi-function apparatus of the first, second, third, fourth, fifth or sixth invention, the specific function is the scanner function.

Thereby, all the functions are operable in a connected state of the AC power line to the AC power source, while even in an unconnected state of the AC power line to the AC power source, if the USB interface is connected to the PC 36, a possible operation can be made using electric power of 5 V at 500 mA supplied from the PC 36. Consequently, when the number of multi-function terminals of handy type increases along with the smaller size of the MFP apparatus, the apparatus has a wider variety of uses and is easy to employ in the case of carrying the USB cable only without having the power source cord, for example. And with these inventions, the user only needs to connect the apparatus via the USB interface to the PC 36 to employ the scanner, whereby the user can employ the scanner very easily.

Incidentally, the communication terminal having a speech communication function for ISDN line was described in Japanese Patent Application Laid-Open No. 2000-134355. In this prior example, a circuit required for the speech operation of the speech communication function in case of a power failure is provided with DC conversion means for supplying electric power based on the local power feed, whereby at the time of power failure, electric power based on the local power feed is supplied to the circuit required for the operation of the speech communication function, and power consumption of the circuits unnecessary for the operation of the speech communication function is suppressed, implementing the speech communication function below power consumption restricted by the local power feed.

Also, in Japanese Patent Application Laid-Open No. H09-98213, it was described that within a housing, there are provided a power source for power failure (secondary battery) and a power supply control unit for controlling the supply of power to switch from a DC power supply circuit to the power source for power failure when no supply of electric power is detected due to a power failure, and to return to the DC power circuit after recovering from the power failure, whereby an automatic answering telephone function is normally implemented in case of a stoppage of commercial power.

However, in the conventional communication terminal as described in Japanese Patent Application Laid-Open No. 2000-134355, a DC/DC converter is required to step down and stabilize the voltage to secure the speech operation based on power from the local power feed, resulting in a problem that it is difficult to make the housing smaller.

Also, there is another problem that the circuit is more complex and expensive, because the DC/DC converter is required other than the circuit for telephone function.

In the prior example as described in Japanese Patent Application Laid-Open No. H09-98213, when the power source for power failure (secondary battery) is provided within the housing, there is a problem that the housing is bigger, with the high price.

The present invention is intended to provide a multi-function terminal with a housing of reasonable size and price.

The present invention provides the multi-function terminal having multiple operation modes, comprising a power source in main body for supplying electric power to the multi-function terminal, the power source in main body being provided at the multi-function terminal, interface means for receiving electric power supplied from outside of the multi-function terminal, terminal external power supply detecting means for detecting the electric power supplied via the interface means, electric power switching means for switching between electric power supplied from the power source in main body and electric power supplied via the interface means from outside of the multi-function terminal, origination control means for originating a call to the public line, and control means for controlling the electric power switching means to supply electric power via the interface means from outside of the multi-function terminal, if the terminal external power supply detecting means detects electric power supplied via the interface means from outside of the multi-function terminal and detects no electric power supplied from the power source in main body.

With the present invention, since the calling process is performed based on electric power supplied from an external terminal such as a PC having an AC power source or battery, it is unnecessary to mount a special circuit for power failure or secondary battery on itself at the time of power failure. Accordingly, there is the effect that the cheap and small multi-function terminal can be provided.

Third Embodiment

Figure 5:
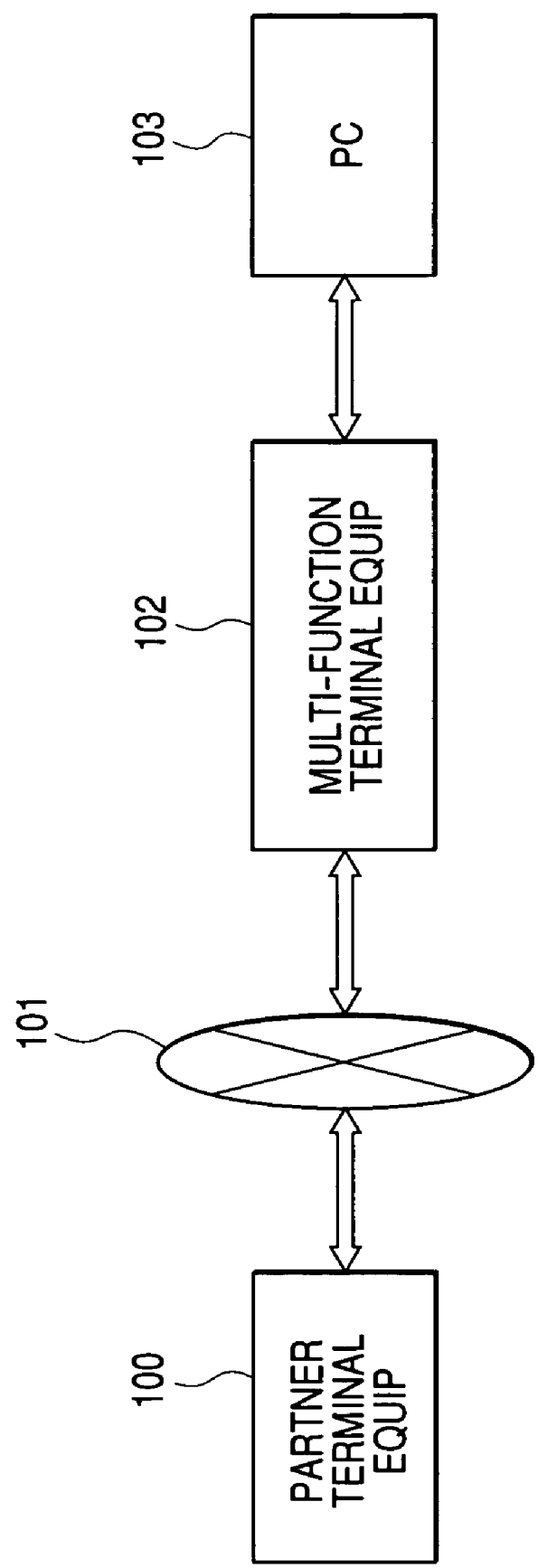
FIG. 5 is a diagram showing the system configuration of a multi-function terminal 102 according to a third embodiment of the present invention.

FIG. 5 is a diagram showing the system configuration of a multi-function terminal 102 according to a third embodiment of the present invention.

A partner terminal 100 is communicable with the communication terminal of the present invention. A public line 101 is the analog telephone line or ISDN. The multi-function terminal 102 has a telephone function, and is communicable with the partner terminal 100 via the public line 101. A PC 103 is a personal computer connected via the USB or IEEE1394 to the multi-function terminal 102 and capable of supplying electric power.

Figure 6:
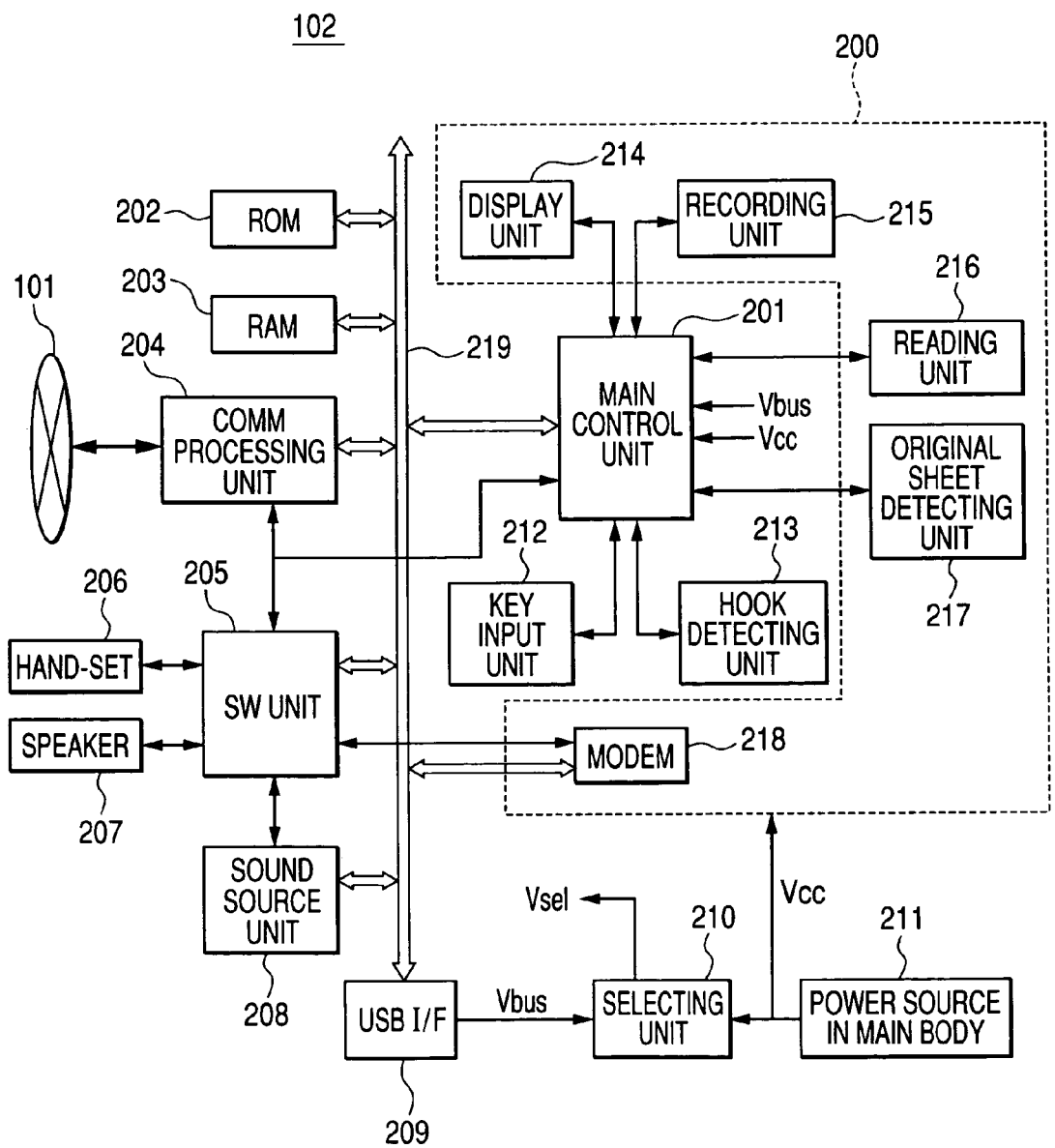
FIG. 6 is a diagram showing an internal configuration of the multi-function terminal 102.

FIG. 6 is a diagram showing the internal configuration of the multi-function terminal 102.

The multi-function terminal 102 comprises a main control unit 201, a ROM 202, a RAM 203, a communication processing unit 204, an analog switch unit 205, a handset 206, a speaker 207, a sound source unit 208, a USB I/F 209, a selecting unit 210, a power source 211 in main body, a key input unit 212, a hook detecting unit 213, a display unit 214, a recording unit 215, a reading unit 216, an original sheet detecting unit 217, a modem 218, an address and data bus 219, and a power off block 200.

The main control unit 201 inputs a signal via the data bus 219 from each unit, and controls each component connected to the data bus 219 in accordance with this input signal. That is, the main control unit 201 performs a call process associated with the speech or the processes for various service functions in accordance with a call processing program stored in the ROM 202. Also, the main control unit 201 internally comprises an A/D converter to monitor the analog signal and detect the presence of absence of various kinds of signal.

Also, the main control unit 201 has a port for inputting a power (Vcc) from the power source in main body and a power (Vbus) signal from the PC 103, and periodically detects a state of the port to check whether the system is operating at Vcc or Vbus.

The ROM 202 stores the programs for implementing a calling process by controlling the communication processing unit 204, a power feed control for controlling power feed from the PC 103, a mail transmitting/receiving process with data modem by controlling the modem 218, a FAX transmission/reception with a facsimile modem, an indication on the number display, and the output of a speech synthesis signal. Also, the ROM 202 may be data writable and erasable E2PROM or flash ROM.

The RAM 203 is a memory for use when the main control unit 201 performs each of the processes including the calling process. The RAM 203 stores temporary data, unlike the ROM 202. The RAM 203 is backed up by a battery or the like and stores a created character message, a received character message, the set contents of various kinds of service and the contents registered in a telephone directory. Also, it is a non-volatile memory composed of E2PROM or the like.

The communication processing unit 204 is an interface for accommodating the public line 101, and in the case of the analog line, comprises a polarity coincidence circuit connected to the telephone line of an office exchange and made up of a full-wave rectification circuit of diode to coincide the polarity of a line voltage, a ringer detection circuit, connected to the subscriber line of the office exchange, for detecting a calling signal from the office exchange, a relay circuit for forming a line loop if an off-hook operation is performed by pressing the handset 206 or off-hook key and sending out a selection signal such as dialing pulse to the office, and a transformer circuit for making the two-wire/four-wire transformation.

Though in this embodiment the analog line is dealt with, the digital line such as ISDN may be configured.

The analog switch unit 205 switches a signal from the modem 218, or an analog input/output signal of the sound source unit 208, the handset 206 and the speaker 207 to be inputted into or outputted from the communication processing unit 204 under the control of the main control unit 201. Also, it internally has an attenuator to convert the level of analog signal.

The handset 206 inputs or outputs the speech. The speaker 207 outputs an incoming tone or the stored speech data, and monitors the FAX communication.

The sound source unit 208 is the sound source of holding tone or incoming melody, and internally stores the sound source data to output an analog signal and output a call progress tone such as DT, BT or RBT under the control of the main control unit 201.

The USB I/F 209 is connected via a cable to the PC 103, and receives power feed from the PC 103 and supplies electric power (Vbus) from the PC 103 to the electing unit 210. It is composed of a driver IC for making data transmission or reception to or from the PC 103 and a transformer.

Figure 7:
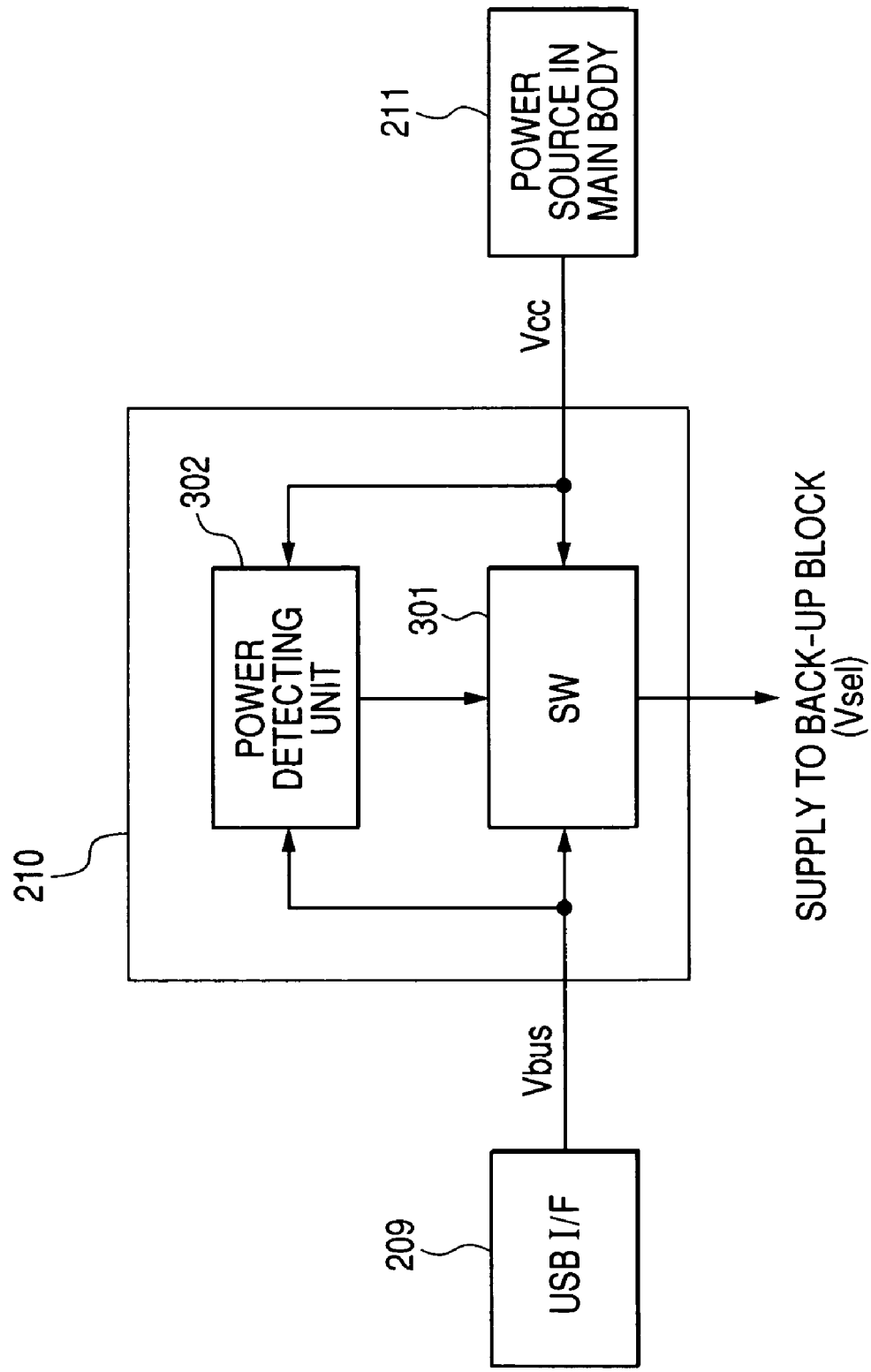
FIG. 7 is a block diagram specifically showing an electing unit 210.

FIG. 7 is a block diagram specifically showing the selecting unit 210.

The electing unit 210 has a switch 301 and a power detecting unit 302.

The switch 301 switches between power from the power source 211 in main body and power from the USB I/F 209, and switches over to the power (Vbus) from the USB I/F 209 and supplies it to a predetermined block when supply of power (Vcc) from the power source 211 in main body is stopped.

The power detecting unit 302 detects the power supplied from the USB I/F 209 or the power source 211 in main body.

Figure 8:
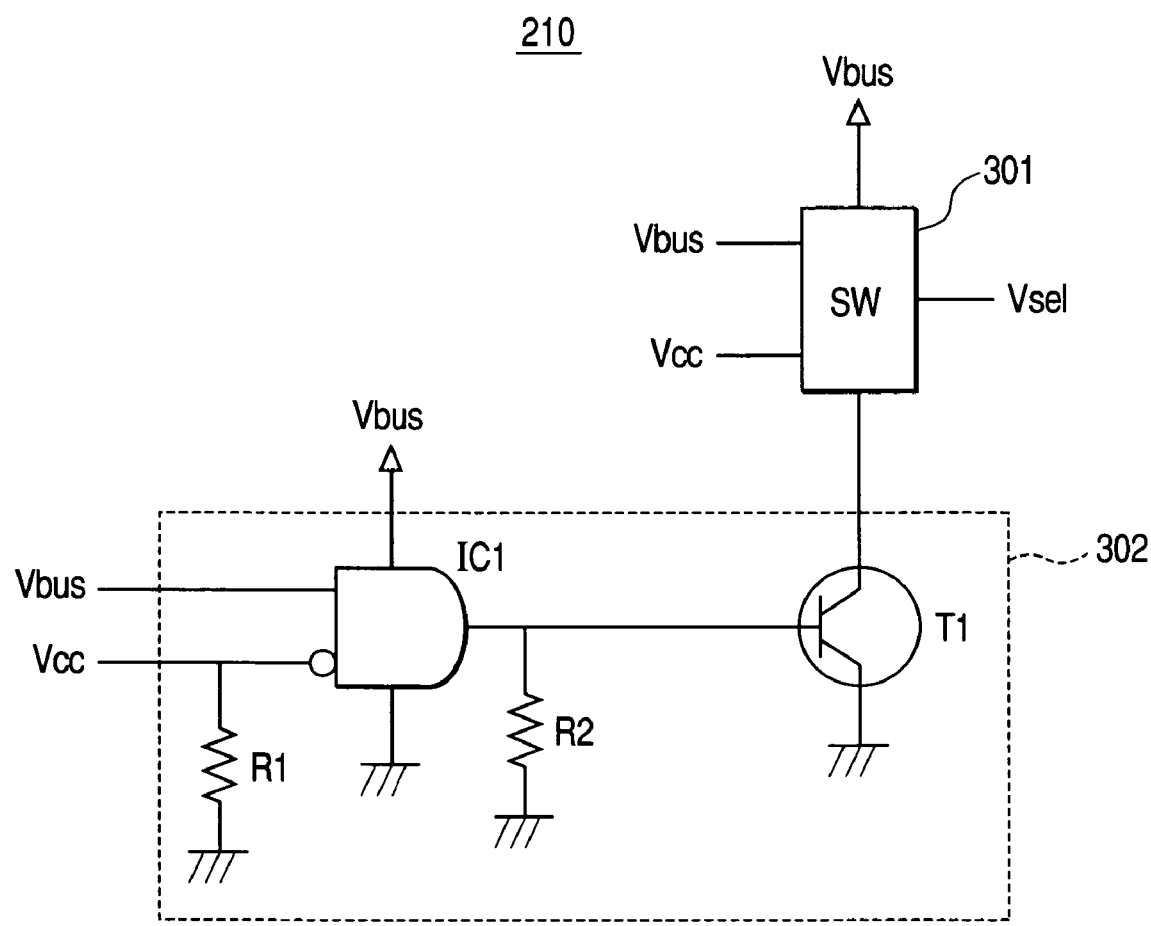
FIG. 8 is a circuit diagram specifically showing the selecting unit 210.

FIG. 8 is a circuit diagram specifically showing the selecting unit 210.

The power detecting unit 302 comprises a gate IC1 with a power source of Vbus, the pull down resistors (R1, R2), and a transistor T1, as shown in FIG. 8. The SW 301 is a relay operable with Vbus.

The power source 211 in main body is composed of a switching AC power source, or a secondary battery to supply electric power (Vcc) to the selecting unit 210 and the power off block 200. The power off block 200 comprises the display unit 214, the recording unit 215, the reading unit 216, the original sheet detecting unit 217 and the modem 218.

The key input unit 212 comprises a dial key for entering the dial number or URL in alphabet or symbol, employing 0 to 9, *, #, and other keys, a transmission key and a reception key for controlling facsimile transmission or reception, an off hook key for controlling the ON/OFF of the line, an automatic answering telephone key for setting up the automatic answering telephone function, a "sleep" key that is pressed to suppress ringing of call incoming, a function key for setting up the function, and a selection key such as a set key for selecting and setting the function when entering a selection mode of the function by pressing the function key.

The hook detecting unit 213 particularly detects the ON/OFF of the handset, and controls the ON/OFF of the line. Also, it detects the hook key and the on hook/off hook state for the start and disconnect of speech.

The display unit 214 displays the time, the line state during communication, and the error, and is principally composed of liquid crystal. It also displays a character message inputted by keys on the key input unit 212 or a received character message, and the set contents of various kinds of service for the telephone set.

The internal structure of the display unit 214 is composed of a liquid crystal panel (TFT, DSTN) for display and a backlight or an inverter for enabling color display. The display unit 214 is suspended for display by the main control unit controlling the inverter or driver if there is no key input for a preset time.

The recording unit 215 has well-known printing means such as a thermosensitive or thermal transfer printer, a laser beam printer, an ink jet printer, and decodes the digital data coded in MH, MR or MMR and prints the decoded data as print data.

The reading unit 216 has well-known original sheet reading means such as a CCD or a contact type sensor array, and converts the analog data read by the reading means into digital data, encodes this converted digital data by a well-known coding method such as MH, MR or MMR, and outputs it.

The original sheet detecting unit 217 detects the presence or absence of an original sheet for transmission on the reading unit 216, and notifies this detection result to the main control unit 201. The power off block 200 is constituted of one part as an operation panel.

The modem 218 is a digital signal processor, and functionally implements a data modem function for making the mail transmission or reception, and a facsimile modem function for making facsimile transmission or reception with G3FAX under the control of the main control unit 201.

The address and data bus 219 is employed by the main control unit 201 to set up each unit.

The operation for switching between power from the USB I/F 209 and power from the power source 211 in main body will be described below.

(When Power Source 211 in Main Body is ON and PC 103 is Not Connected)

When the PC 103 is not connected with the USB I/F 209, no electric power is supplied to Vbus. Vcc from the power source 211 in main body is only supplied to the electing unit 210.

A transmission gate can gate Vcc inputted into the IC1, when there is no Vbus. When no Vbus is supplied, the relay SW1 is not energized, and Vcc is supplied to Vsel.

(When Power Source 211 in Main Body is ON and PC 103 is Connected)

When the PC 103 is connected with the USB I/F 209, and Vcc is supplied from the power source 211 in main body, Vbus and Vcc are supplied to the electing unit 210.

If Vbus is supplied to the IC1, the gate IC1 becomes effective. When Vbus is "H" and Vcc is "H", the gate IC1 outputs "L". If the gate IC1 outputs "L", the transistor T1 is not turned on, so that the relay SW1 outputs Vcc to Vsel.

This circuit outputs Vcc to Vsel while electric power Vcc is supplied from the power source 211 in main body.

(When Power Source 211 in Main Body is OFF and PC 103 is Connected)

When the PC 103 is connected with the USB I/F 209, and Vcc is not supplied from the power source 211 in main body, Vbus is only supplied to the electing unit 210.

If Vbus is supplied to the gate IC1, the gate becomes effective. When Vcc is not supplied, Vbus "H" and Vcc "L" through the pull down resistor R2 are inputted into the gate IC1. With these inputs, "H" is inputted into the base of the transistor T1, so that the transistor T1 is turned on. When the transistor T1 is turned on, the switch SW 301 is energized and changed, so that Vbus is outputted to Vsel.

Figure 9:
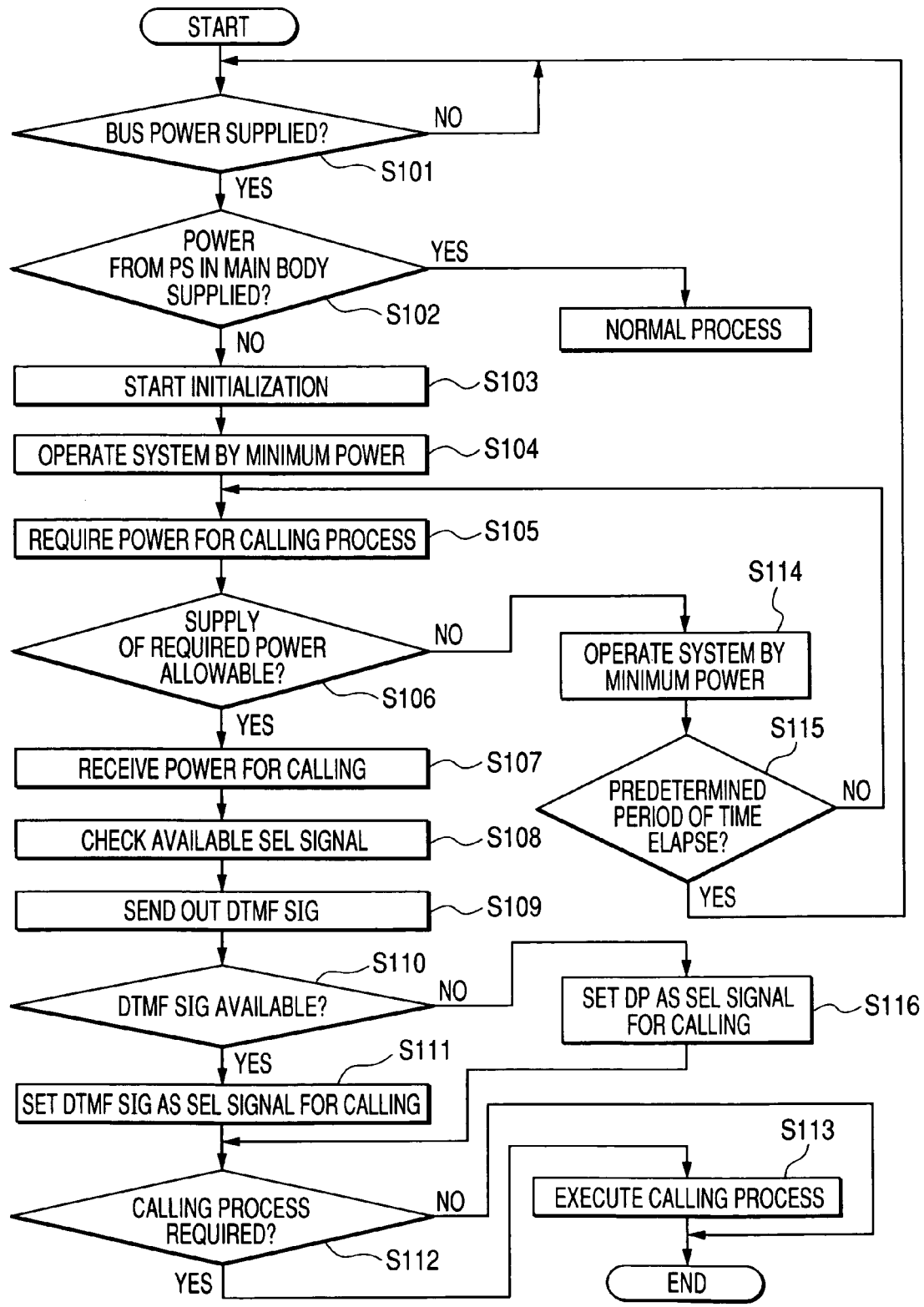
FIG. 9 is a flowchart showing a calling operation employing only a USB bus power at the multi-function terminal 102.

FIG. 9 is a flowchart showing the operation of calling only employing the USB bus power at the multi-function terminal 102.

The main control unit 201 periodically monitors a predetermined port to detect that currently supplied power is supplied from the USB I/F 209. The main control unit 201 detects that Vbus is supplied from the USB I/F 209 (S101), and then detects that in addition to Vbus, Vcc is also supplied from the power source 211 in main body (S102). If Vcc is also supplied, the main control unit 201 continues a normal process.

If the main control unit 201 detects that Vcc is not supplied from the power source 211 in main body (S102), it is judged that the terminal operates with Vbus from the USB I/F 209, and only the block capable of emulation with the host PC 103 is operated.

Moreover, an interrupt from the block operating with Vcc power source or a process for masking a detection signal is performed. Also, the input signal is not only masked, but also the internal clock is stopped to be supplied to a display unit controller for controlling the display unit 214 provided within the main control unit 201, an A/D converter unit for converting analog signal from the reading unit 216 into digital signal and a PWM unit for controlling the recording unit 215, and the initialization such as resetting is performed (S103).

Moreover, the reset process is performed not to consume power for the peripheral blocks including the communication processing unit 204, the switch unit 205, the sound source unit 208, the key input unit 212 and the hook detection unit 213.

If the initialization process is ended, the system is operated at minimum power supplied from the PC 103 (S104), a process for requesting electric power for the calling process from the PC 103 is performed (S105). As a general rule, a current from 200 to 300 mA is necessary to make a call to the line.

After requesting electric power from the PC 103, if it is detected that supply of a desired power is not allowable (S106), the operation process by minimum power is continued (S114), and monitored to check whether or not a processing time elapses (S115). If it is detected that a predetermined period of time has elapsed, the process for monitoring the bus power is restarted.

If the main control unit 201 detects that the desired power can be supplied (S106), the main control unit 201 performs a process for accepting the operation from the peripheral blocks including the communication processing unit 204 which is suspended in the processing, the switch unit 205, the sound source unit 208, the key input unit 212, and the hook detection unit 213, and receives electric power supplied from the USB I/F 209 to be ready for the calling process (S107).

Judging that the system is operated by electric power supplied from the USB I/F 209, the main control unit 201 checks the public line 101 to see which selection signal the line connected to itself accepts (S108). After checking the public line 101, the setting of the A/D converter contained is made effective, and a dial tone signal from the line is detected. The main control unit 201 controls the relay within the communication processing unit 204 to close a DC loop. Thereafter, it controls the sound source unit 208 and the switch unit 205 to output a DTMF signal via the communication processing unit 205 to the line (S109).

After sending out the DTMF signal, if the dial tone signal from the communication processing unit 204 is detected, and stopped (S110), the calling with the DTMF is set up, judging that the calling with the DTMF signal is possible (S111). If the dial tone is not stopped in sending the DTMF, the main control unit 201 sets DP as the selection signal for calling (S116).

If the main control unit 201 detects that the calling process is performed by referring to the status of the hook detection unit 213 (S112), the calling process is performed, employing the set selection signal, based on the input dial signal pressed by the key input unit 212 (S113). If the answer is NO at step S112, the procedure goes to END.

Though in this embodiment the communication processing unit 204 is described for the analog line, a network controller or ADSL capable of making the Internet connection by DSU (Digital Service Unit) of the ISDN or VOIP may be employed.

This application claims priority from Japanese Patent Application No. 2004-084061 filed Mar. 23, 2004, which is hereby incorporated by reference herein.

What is claimed is:

1. A multi-function apparatus available for multiple purposes, comprising:
    means for detecting a connection between a USB interface and a PC;
    means for detecting a connection to an AC power line; and
    control means for selecting an operable function depending on a detected state of the connection between said USB interface and said PC and a detected state of the connection to said AC power line,
    wherein if said USB interface and said PC are connected and said multi-function apparatus is connected to said AC power line, all the functions in said multi-function apparatus are operable, while if said USB interface and said PC are connected and said multi-function apparatus is not connected to said AC power line, a specific function in said multi-function apparatus is operable and other functions than said specific function are not operable.

2. The multi-function apparatus according to claim 1, wherein said operable function is at least one of the copy function, the scanner function, and the print function.

3. The multi-function apparatus according to claim 1, wherein said operable function is at least one of the copy function, the scanner function, the print function, and the facsimile function.

4. The multi-function apparatus according to claim 1, wherein said specific function is the scanner function.

5. A control method for a multi-function apparatus available for multiple purposes, comprising:
    a step of detecting a connection between a USB interface and a PC;
    a step of detecting a connection to an AC power line; and
    a control step of selecting an operable function depending on a detected state of the connection between said USB interface and said PC and a detected state of the connection to said AC power line,
    wherein if said USB interface and said PC are connected and said multi-function apparatus is connected to said AC power line, all the functions in said multi-function apparatus are operable, while if said USB interface and said PC are connected and said multi-function apparatus is not connected to said AC power line, a specific function in said multi-function apparatus is operable and other functions than said specific function are not operable.

6. The control method for the multi-function apparatus according to claim 5, wherein said operable function is at least one of the copy function, the scanner function, and the print function.

7. The control method for the multi-function apparatus according to claim 5, wherein said operable function is at least one of the copy function, the scanner function, the print function, and the facsimile function.

8. The control method for the multi-function apparatus according to claim 5, wherein said specific function is the scanner function.

* * * * *